Patented Feb. 9, 1954

2,668,811

UNITED STATES PATENT OFFICE 2,668,811

MONOAZO-DYESTUFFS

Heinrich Zollinger, Binningen, and Rudolf Ruegg, Basel, Switzerland, assignors to Ciba Limited, Basel, Switzerland, a Swiss firm No Drawing. Application November 2, 1951,
Serial No. 254,646

Claims priority, application Switzerland
November 7, 1950

14 Claims. (Cl. 260—199)

This invention provides monoazo-dyestuffs of the type of the product of the formula (1)
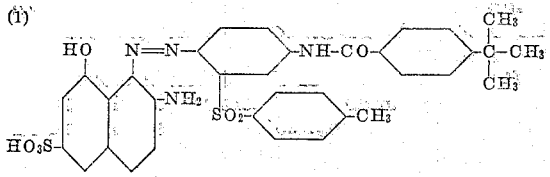

These dyestuffs correspond to the general formula (2)
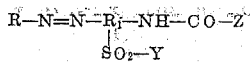

in which R represents the radical of a 2-aminonaphthalene-6-monosulfonic acid bound in the 1-position to the azo group, $R_1$ represents a benzene radical, Y represents an aryl radical or the group

(in which $R_2$ represents a hydrogen atom, or an alkyl or aryl radical, and $R_3$ represents a saturated hydrocarbon radical), and Z represents a benzene radical containing as a substituent at least one saturated hydrocarbon radical having at least 3 and at most 8 carbon atoms. As saturated hydrocarbon radicals, there are intended here alkyl radicals and also radicals of the alicyclic series, especially the cyclohexyl radical.

For the production of these monoazo-dyestuffs in accordance with the invention a 2-aminonaphthalene-6-monosulfonic acid containing a primary amino group in 2-position such as the 2-aminonaphthalene-6-sulfonic acid itself, and especially the 2-amino-8-hydroxynaphthalene-6-sulfonic acid, is coupled in an acid medium with a diazo-compound of an amino-sulfone or amino-sulfonic acid amide of the formula (3)
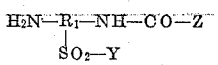

in which the symbols $R_1$, Z and Y have the meanings given above in connection with Formula 2. This applies also in the case of the formulae given below.

The amino-sulfones and amino-sulfonic acid amides of the Formula 3, which are used as starting materials in the present process, are new. They can be made by methods in themselves known, for example, by monoacylating an appropriate diamino-sulfone or diamino-sulfonic acid amide of the formula (4)
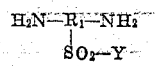

with a halide of an acid of the formula (5)  HOOC—Z

As examples of suitable acid halides there may be mentioned: 4 - cyclohexyl - benzene - 1 - carboxylic acid chloride or bromide, 4-isopropyl-benzene-1-carboxylic acid chloride, 4-tertiary-amyl-benzene-1-carboxylic acid chloride, 2-methyl-4-tertiary - butyl - benzene - 1 - carboxylic acid chloride, 2:6-dimethyl-4-tertiary-butyl-benzene-1-carboxylic acid chloride, 4-n-octyl-benzene-1-carboxylic acid chloride, or 3- or 4-tertiary-butyl-benzene-carboxylic acid chloride. The diamines of the Formula 4 may contain as the radical Y an aryl radical, especially an aryl radical of the benzene series, for example, a substituted or unsubstituted phenyl radical such as a methylphenyl, chlorophenyl or methoxyphenyl radical, or the radical of a primary or secondary amine, for example of an aliphatic amine of low molecular weight i. e. containing up to 6 carbon atoms, such as a methylamino, dimethyl amino, diethyl amino or cyclohexyl amino group, or the radical of an aromatic amine of the benzene series such as a methylphenylamino, and especially the N-ethyl-phenyl amino group. As examples of amino-sulfones and amino-sulfonic acid amides which are obtainable from these diamines by the methods described, there may be mentioned the following:

2-amino-5-(4''-tertiary-butyl- or -cyclohexylbenzoylamino) - 4' - methoxy - 1:1' - diphenyl sulfone, 2 - amino - 5 - (4'' - tertiary - butylbenzoylamino)-1:1'-diphenyl sulfone and especially 2 - amino - 5 - (4'' - tertiary - butylbenzoylamino) - 4' - methyl - 1:1' - diphenyl sulfone, and also 2 - amino - 5 - (4' - tertiary-butylbenzoylamino) - benzene - 1 - sulfonic acid methyl- or ethylamide, 2-amino-5-(4'-tertiary-butylbenzoylamino) - benzene - 1 - sulfonic acid dimethyl- or diethyl - amide, 2 - amino - 5 - (4'-tertiary - butylbenzoylamino) - benzene - 1-sulfonic acid-cyclohexylamide, 2-amino-5-(4'-n-propyl- or -tertiary - butylbenzoylamino) - benzene - 1 - sulfonic acid -N - methyl - 1-phenylamide, 2 - amino - 5 - (4' - tertiary-butyl- or -cyclohexylbenzoylamino) - benzene-1-sulfonic acid-N-ethyl-phenylamide.

These amino-sulfones and amino-sulfonic acid amides can be diazotized by the methods usual for diazotizing compounds difficult to diazotize, for example, by means of nitrosyl-sulfuric acid. It is often of advantage to separate the diazo-compounds, for example, by diluting the diazotization mixture with water, separating the compound by filtration, and then coupling it with the 2-aminonaphthalene-6-sulfonic acid. The coupling is carried out in an acid medium, for example, a medium rendered weakly acid to Congo with acetic acid. Thus, for example, the 2- aminonaphthalene-6-mono-sulfonic acid to be used is first converted into an alkali salt, reconverted into free acid by the addition of acetic acid, whereby a suspension is obtained, and then causing the filtered diazo-compound to couple in this suspension. The free mineral acid resulting from the coupling reaction is then neutralized, for example, with sodium acetate and if desired the temperature is raised somewhat. The coupling mixture may be worked up in a manner in itself known, for example, by neutralization with sodium carbonate, separation of the dyestuff by filtration and drying.

The dyestuffs obtainable by the present process are new and in the form of the free acids they correspond to the above general Formula 2. Among them those of the formula

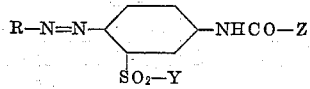

especially those which contain as radical Z a benzene radical containing, preferably in p-position to the —CO— group, an alkyl radical having at least 3 and at most 6 carbon atoms are particularly valuable. They are suitable for dyeing or printing a very wide variety of materials especially those of animal origin such as leather, silk and above all wool, and also various artificial fibers, for example, those composed of animalized artificial silk, superpolyamides and superpolyurethanes, etc. The dyeings obtained with these dyestuffs are distinguished by their valuable tints and good properties of fastness.

The following examples illustrate the invention, the parts and percentages being by weight.

*Example 1*

42.3 parts of 2-amino-5-(4''-tertiary-butyl-benzoyl-amino)-4'-methyl-1:1'-diphenyl-sulfone are introduced into a solution of nitrosyl-sulfuric acid in sulfuric acid corresponding to 7 parts of sodium nitrite. When the diazotization is complete, the mixture is poured on to ice and the precipitated yellowish diazo-compound is separated by filtering with suction. 23.9 parts of 2-amino-8-hydroxynaphthalene-6-sulfonic acid are thoroughly pasted with 13.5 parts of sodium hydroxide solution of 30% strength and 20 parts of water, and the free acid is liberated from the resulting sodium salt by means of an excess of acetic acid. The diazo-compound is triturated with the resulting paste. After a short time the whole is diluted with 200 parts of water and the free sulfuric acid is slowly neutralized at a moderately raised temperature with sodium acetate. When the coupling is complete the whole is neutralized with sodium carbonate, and the dyestuff which in its free acid state corresponds to the formula

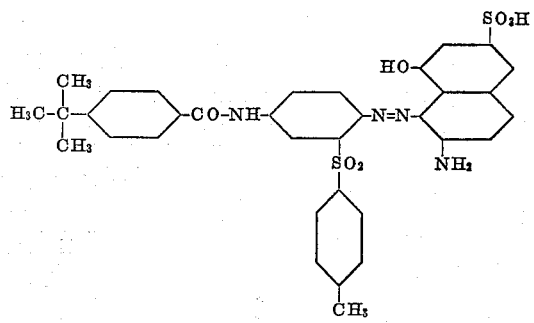

is separated by filtration and dried. It is a dark powder which dissolves in water with a red-violet coloration and dyes wool from an acetic acid bath Bordeaux red tints having excellent properties of wet fastness.

By using, instead of the aforesaid diazo-component, 2 - amino-5-(4''-tertiary-butyl-benzoyl-amino)-1:1'-diphenyl-sulfone there is obtained a dyestuff having similar properties.

The 2 - amino - 5 - (4'' - tertiary-butyl-benzoyl-amino) -4'-methyl-1:1'-diphenyl-sulfone used as diazo-component may be prepared as follows:

A suspension of 26.2 parts of very finely divided 2:5 - diamino-4'-methyl-1:1'-diphenyl-sulfone in 180 parts of water is mixed dropwise at room temperature in the course of 2 to 5 hours with 19.65 parts of para-tertiary-butyl-benzoyl-chloride (boiling at 107°–109° C. under 4 mm. pressure). By the simultaneous addition of an aqueous solution of sodium acetate the resulting mineral acid is neutralized. In order to complete the acylation the whole is heated for a short time at about 70° C., and then the resulting water-insoluble 2-amino-5-(4''-tertiary-butyl-benzoyl-amino)-4'-methyl-1:1'-diphenyl-sulfone is separated by filtration and dried. It is a slightly violet-grey powder and melts at 190–192° C.

By using in the manner described above 24.8 parts of 2:5-diamino-1:1'-diphenyl-sulfone, instead of 26.2 parts of 2:5-diamino-4'-methyl-1:1'-diphenyl-sulfone, there is obtained 2-amino-5-(4''-tertiary - butyl - benzoyl - amino)-1:1'-diphenyl-sulfone in the form of a violet-grey powder melting at 187°–190° C.

In the following table are given additional dyestuffs which can be made by the method described in the first paragraph of this example by coupling in an acid medium the diazo-compound of an amine given in column 1 with the coupling component given in column 2. Certain properties of the dyestuffs so obtained are given in columns 3 and 4.

| Diazo-component | Coupling-component | Color of solution in water | Color of dyeing on wool from an acetic acid bath |
| --- | --- | --- | --- |
| 2-amino-5-(4''-tertiary-butyl-benzoylamino)-benzene-1-sulfonic acid cyclohexylamide. | 2-amino-8-hydroxy-naphthalene-6-sulfonic acid. | blue-red | blue-red. |
| 2-amino-5-(4''-tertiary-butyl-benzoylamino)-benzene-1-sulfonic acid diethylamide. | ___do___ | ___do___ | Do. |
| Do. | 2-aminonaphthalene-6-sulfonic acid | orange | orange. |
| 2-amino-5-(4''-isopropyl-benzoylamino)-benzene-4'-methyl-1:1'-diphenyl-sulfone. | 2-amino-8-hydroxy-naphthalene-6-sulfonic acid. | blue-red | blue-red. |
| 2-amino-5-(4''-n-propyl-benzoylamino)-benzene-4'-methyl-1:1'-diphenyl-sulfone. | ___do___ | ___do___ | Do. |
| 2-amino-5-(4'-cyclo-hexyl-benzoylamino)-benzene-1-sulfonic acid-N-ethyl-phenylamide. | ___do___ | ___do___ | Do. |
| 2-amino-5-(4''-n-propyl-benzoylamino)-benzene-1-sulfonic acid-N-ethyl-phenylamide. | ___do___ | ___do___ | Do. |
| 2-amino-5-(4''-isopropyl-benzoylamino)-benzene-1-sulfonic acid-N-ethyl-phenylamide. | ___do___ | ___do___ | Do. |

The first dyestuff of this table in its free acid state corresponds to the formula

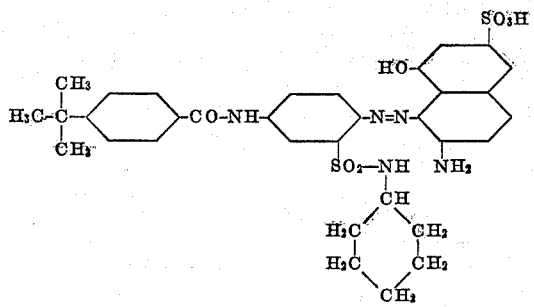

the third to the formula

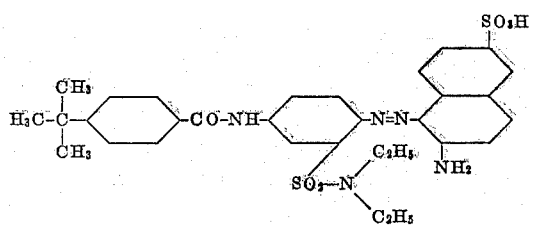

the fourth to the formula

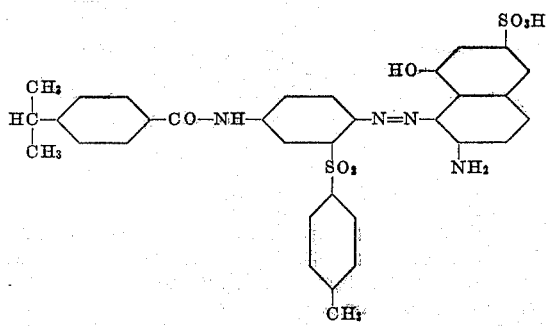

and the sixth to the formula

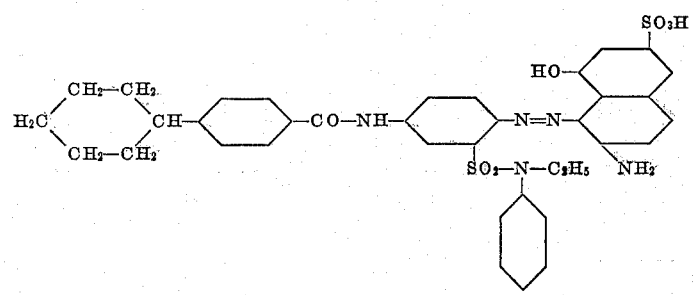

Example 2

45.1 parts of 2-amino-5-(4'-tertiary-butyl-benzoylamino)-benzene-1-sulfonic acid-N-ethyl-phenylamide melting at 203° C. are introduced into a solution of nitrosyl-sulfuric acid in sulfuric acid corresponding to 7 parts of sodium nitrite. When the diazotization is complete the whole is poured on to 1,000 to 1,200 parts of ice, and the diazo-compound is brought into an easily filtrable form by stirring and then separated by filtration with suction. 25.3 parts of 2-methyl-amino-8-hydroxynaphthalene-6-sulfonic acid are stirred with 13.5 parts of sodium hydroxide solution of 30% strength and 50 parts of water, and the acid is liberated from the resulting sodium salt by means of an excess of acetic acid. The diazo-paste is added to the resulting suspension, and the liberated mineral acid is neutralized with sodium acetate at a moderately raised temperature, advantageously at about 40° C. When the coupling is complete the whole is rendered weakly alkaline with sodium carbonate. The dyestuff is separated by filtration and dried. It is a grey-violet powder which dissolves in water with a reddish-violet coloration and dyes wool from an acetic acid bath somewhat reddish brownish violet tints having excellent properties of wet fastness.

Example 3

2 parts of the dyestuff obtainable as described in the first paragraph of Example 1 are dissolved in 4,000 parts of water, 10 parts of crystalline sodium sulfate are added to the dyebath, and 100 parts of wool are entered at 40-50° C. There are then added 3 parts of acetic acid of 40% strength, the whole is raised to the boil in the course of half an hour and dyeing is carried on for ¾ of an hour at that temperature. After rinsing and drying the material a fast Bordeaux red dyeing is obtained.

What is claimed is:

1. A monoazo-dyestuff which in the form of the free acid corresponds to the formula

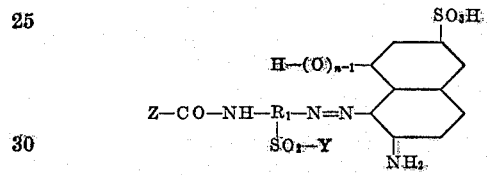

wherein $n$ stands for a whole number which is at most 2, Z represents a benzene radical substituted by at least one saturated hydrocarbon group of at least 3 and at most 8 carbon atoms, $R_1$ represents a benzene radical and Y represents a member selected from the group consisting of a benzene radical and the radicals

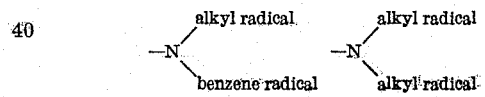

and —NH—X, X being a saturated hydrocarbon radical.

2. A monoazo-dyestuff which in the form of the free acid corresponds to the formula

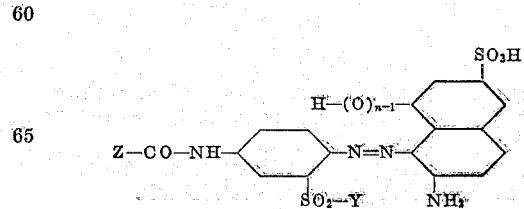

wherein $n$ stands for a whole number which is at most 2, Z represents a benzene radical containing at least one alkyl group of at least 3 and at most 8 carbon atoms and Y represents a benzene radical.

3. A monoazo-dyestuff which in the form of the free acid corresponds to the formula

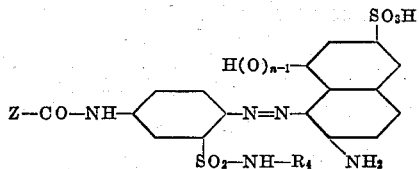

wherein $n$ stands for a whole number which is at most 2, Z represents a benzene radical containing at least one alkyl group of at least 3 and at most 8 carbon atoms and $R_4$ represents a saturated hydrocarbon group of low molecular weight.

4. A monoazo-dyestuff which in the form of the free acid corresponds to the formula

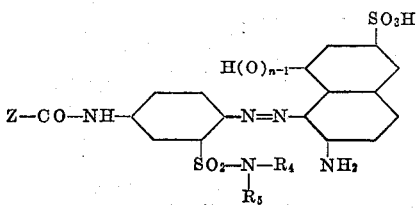

wherein $n$ stands for a whole number which is at most 2, Z represents a benzene radical containing at least one alkyl group of at least 3 and at most 8 carbon atoms, $R_4$ and $R_5$ represent alkyl groups of low molecular weight.

5. A monoazo-dyestuff which in the form of the free acid corresponds to the formula

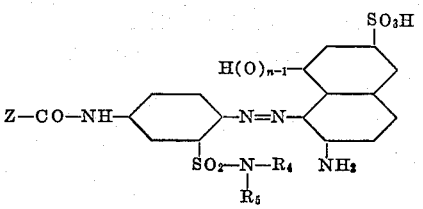

wherein $n$ stands for a whole number which is at most 2, Z represents a benzene radical containing at least one saturated hydrocarbon group of at least 3 and at most 8 carbon atoms, $R_4$ represents an alkyl group of low molecular weight and $R_5$ a benzene radical.

6. A monoazo-dyestuff which in the form of the free acid corresponds to the formula

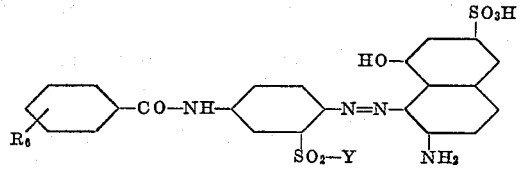

wherein $R_6$ represents an alkyl radical containing at least 3 and at most 8 carbon atoms and Y represents a benzene radical.

7. A monoazo-dyestuff which in the form of the free acid corresponds to the formula

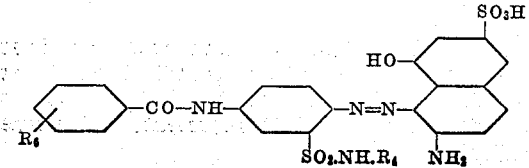

wherein $R_6$ represents an alkyl radical containing at least 3 and at most 8 carbon atoms and $R_4$ represents a cyclohexyl radical.

8. A monoazo-dyestuff which in the form of the free acid corresponds to the formula

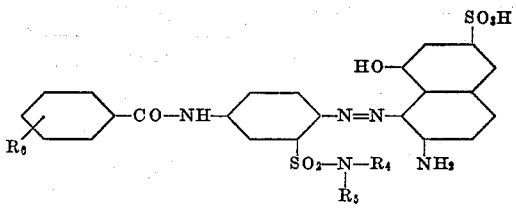

wherein $R_6$ represents a saturated hydrocarbon radical containing at least 3 and at most 8 carbon atoms and $R_4$ represents an alkyl radical containing up to 6 carbon atoms and $R_5$ represents a benzene radical.

9. A monoazo-dyestuff which in the form of the free acid corresponds to the formula

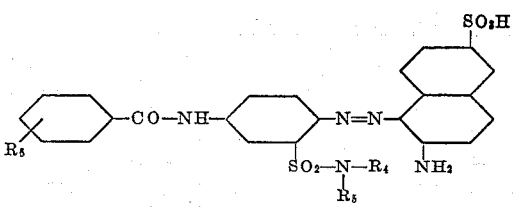

wherein $R_6$ represents an alkyl radical containing at least 3 and at most 8 carbon atoms and $R_4$ and $R_5$ each represent alkyl radicals containing up to 6 carbon atoms.

10. The monoazo-dyestuff which in the form of the free acid corresponds to the formula

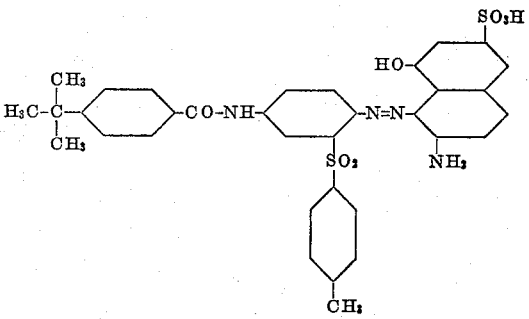

11. The monoazo-dyestuff which in the form of the free acid corresponds to the formula

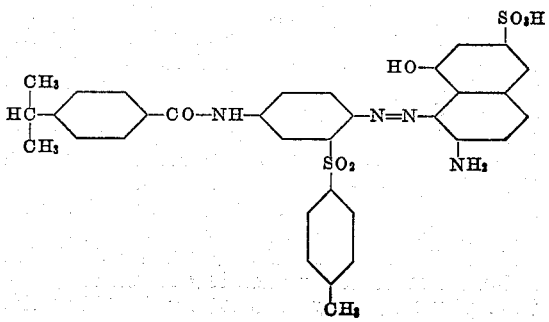

12. The monoazo-dyestuff which in the form of the free acid corresponds to the formula

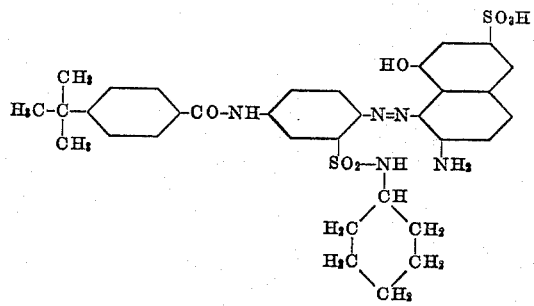

13. The monoazo-dyestuff which in the form of the free acid corresponds to the formula

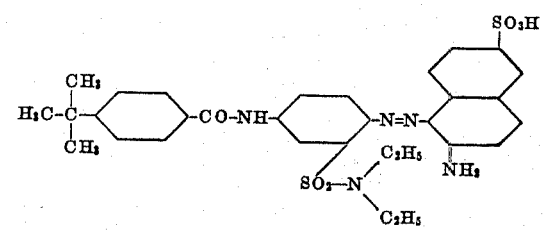

14. The monazo-dyestuff which in the form of the free acid corresponds to the formula

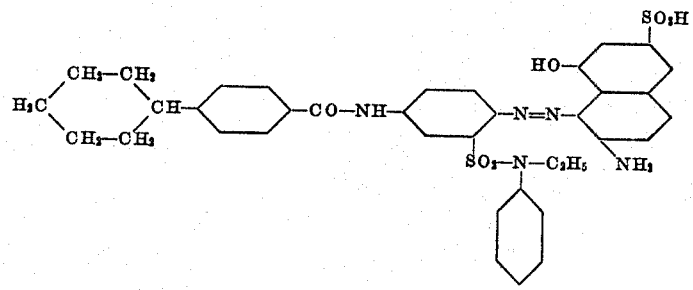

HEINRICH ZOLLINGER.
RUDOLF RUEGG.

References Cited in the file of this patent
UNITED STATES PATENTS

| Number | Name | Date |
|---|---|---|
| 1,840,385 | Clingestein et al. | Jan. 12, 1932 |
| 2,505,268 | Widmer | Apr. 25, 1950 |